United States Patent
Erdogan et al.

(10) Patent No.: US 10,860,563 B2
(45) Date of Patent: Dec. 8, 2020

(54) DISTRIBUTED DATABASE WITH MODULAR BLOCKS AND ASSOCIATED LOG FILES

(75) Inventors: Ozgun Ali Erdogan, Istanbul (TR); Sumedh Suhas Pathak, Istanbul (TR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 332 days.

(21) Appl. No.: 13/345,620

(22) Filed: Jan. 6, 2012

(65) Prior Publication Data

US 2013/0311441 A1 Nov. 21, 2013

(51) Int. Cl.
| | | |
|---|---|---|
| *G06F 7/00* | (2006.01) | |
| *G06F 17/30* | (2006.01) | |
| *G06F 16/22* | (2019.01) | |
| *G06F 16/27* | (2019.01) | |
| *G06F 16/21* | (2019.01) | |
| *G06F 16/245* | (2019.01) | |
| *G06F 16/28* | (2019.01) | |
| *G06F 11/34* | (2006.01) | |
| *G06F 11/20* | (2006.01) | |

(52) U.S. Cl.
CPC ........ *G06F 16/2282* (2019.01); *G06F 16/211* (2019.01); *G06F 16/245* (2019.01); *G06F 16/27* (2019.01); *G06F 16/273* (2019.01); *G06F 16/278* (2019.01); *G06F 16/285* (2019.01); *G06F 11/2094* (2013.01); *G06F 11/2097* (2013.01); *G06F 11/3409* (2013.01); *G06F 11/3485* (2013.01)

(58) Field of Classification Search
USPC ........................................................ 707/713
See application file for complete search history.

(56) References Cited

U.S. PATENT DOCUMENTS

| | | | | |
|---|---|---|---|---|
| 5,640,561 | A | * | 6/1997 | Satoh .................. G06F 11/1471 |
| 5,734,829 | A | * | 3/1998 | Robinson ...................... 709/205 |
| 5,819,083 | A | | 10/1998 | Chen et al. |
| 5,960,194 | A | | 9/1999 | Choy et al. |
| 7,546,284 | B1 | | 6/2009 | Martinez |
| 7,725,440 | B2 | | 5/2010 | Reed et al. |
| 7,844,687 | B1 | * | 11/2010 | Gelvin .................... H04L 67/12 709/220 |
| 7,899,851 | B2 | | 1/2011 | Ito et al. |
| 7,895,501 | B2 | | 2/2011 | Brown |

(Continued)

FOREIGN PATENT DOCUMENTS

| | | |
|---|---|---|
| JP | 5-012338 | 1/1993 |
| JP | 9-218858 | 8/1997 |

(Continued)

OTHER PUBLICATIONS

International Search Report and Written Opinion, issued to international patent application No. PCT/US13/20146, dated Mar. 7, 2013, 8 pgs.

(Continued)

*Primary Examiner* — Muluemebet Gurmu
(74) *Attorney, Agent, or Firm* — Workman Nydegger

(57) ABSTRACT

A system includes a master node and worker nodes controlled by the master node. Each worker node stores 25 or more modular blocks of a distributed database, where each modular block has a size of 5G bytes or less and has an associated log file.

18 Claims, 8 Drawing Sheets

(56) References Cited

U.S. PATENT DOCUMENTS

| | | | |
|---|---|---|---|
| 7,917,512 | B2 | 3/2011 | Bhide et al. |
| 8,311,998 | B2* | 11/2012 | Correll, Jr. .................... 707/706 |
| 8,392,482 | B1 | 3/2013 | McAlister et al. |
| 2002/0133491 | A1* | 9/2002 | Sim .................. G06F 17/30067 |
| 2002/0169745 | A1 | 11/2002 | Hotti et al. |
| 2003/0055807 | A1 | 3/2003 | Lomet |
| 2006/0079967 | A1 | 4/2006 | Roby et al. |
| 2007/0050400 | A1 | 3/2007 | Durbin |
| 2007/0233753 | A1 | 10/2007 | Taniguchi et al. |
| 2007/0266119 | A1* | 11/2007 | Ohly ............................ 709/220 |
| 2007/0271280 | A1 | 11/2007 | Chandasekaran |
| 2008/0027788 | A1 | 1/2008 | Lawrence et al. |
| 2008/0046779 | A1 | 2/2008 | Merchant et al. |
| 2008/0052322 | A1 | 2/2008 | Gusciora |
| 2008/0059555 | A1* | 3/2008 | Archer et al. ................ 709/201 |
| 2008/0189239 | A1 | 8/2008 | Bawa et al. |
| 2008/0256029 | A1 | 10/2008 | Abrink |
| 2008/0256179 | A1 | 10/2008 | Gorty et al. |
| 2008/0256202 | A1 | 10/2008 | Williams et al. |
| 2008/0256203 | A1 | 10/2008 | Gorty et al. |
| 2008/0256204 | A1 | 10/2008 | Kamat et al. |
| 2008/0313246 | A1 | 12/2008 | Shankar et al. |
| 2009/0089879 | A1 | 4/2009 | Wang et al. |
| 2009/0094294 | A1 | 4/2009 | Morris et al. |
| 2009/0144235 | A1 | 6/2009 | Bhide et al. |
| 2010/0017399 | A1* | 1/2010 | Bayliss ............................ 707/5 |
| 2010/0106934 | A1 | 4/2010 | Calder et al. |
| 2010/0183035 | A1 | 7/2010 | Li |
| 2011/0010330 | A1 | 1/2011 | McCline et al. |
| 2011/0162069 | A1* | 6/2011 | Aupperle .............. G06F 21/552 726/22 |
| 2011/0178985 | A1 | 7/2011 | San Martin Arribas et al. |
| 2011/0213775 | A1 | 9/2011 | Franke et al. |
| 2011/0271135 | A1 | 11/2011 | Kobashi |
| 2011/0302151 | A1* | 12/2011 | Abadi et al. .................. 707/714 |
| 2012/0150819 | A1* | 6/2012 | Lindahl ............ G06F 17/30536 707/687 |
| 2012/0159627 | A1 | 6/2012 | Aupperle et al. |
| 2016/0070736 | A1 | 3/2016 | Swan et al. |

FOREIGN PATENT DOCUMENTS

| | | |
|---|---|---|
| WO | 2005/091736 A2 | 10/2005 |
| WO | 2011/118427 A1 | 9/2011 |

OTHER PUBLICATIONS

International Search Report and Written Opinion issued to International Patent Application No. PCT/US2013/020147, dated Mar. 7, 2013, 10 pgs.

Copenheaver, Blaine R., International Search Report and Written Opinion issued to international patent application No. PCT/US13/20143, dated Mar. 13, 2013, 9 pgs.

International Search Report and Written Opinion issued to international patent application No. PCT/US13/20142, dated Mar. 19, 2013, 7 pgs.

Baru et al, "DB2 Parallel Edition", IBM Systems Journal, IBM Corp. Armonk, New York, US, vol. 34, No. 2, Mar. 21, 1995, pp. 292-322.

Gray et al., "Transaction Processing: Concepts and Techniques", Jan. 1, 1993, pp. 493-525.

Extended European Search Report issued to European Patent Application No. 13733928.9, dated May 29, 2015, 9 pgs.

Kossman, "The State of the Art in Distributed Query Processing", ACM Computing Surveys, vol. 32, No. 4, Dec. 2000, pp. 422-469.

Özsu et al., "Principles of Distributed Database Systems, Chapter 14: Parallel Database Systems", Third Edition, Mar. 2, 2011, Springer, New York, NY, ISBN: 978-1-44-198834-8, pp. 497-550.

Thomson et al., "The Case for Determinism in Database Systems", Proceedings of the VLDB Endowment, vol. 3, No. 1, Sep. 13-17, 2010, 11 pgs.

"Non Final Office Action Issued in U.S. Appl. No. 15/056,707", dated Jul. 9, 2020, 19 Pages.

"Final Office Action Issued in U.S. Appl. No. 15/056,707", dated Oct. 5, 2018, 20 Pages.

"Non Final Office Action Issued in U.S. Appl. No. 15/056,707", dated Dec. 19, 2017, 18 Pages.

"Non Final Office Action Issued in U.S. Appl. No. 15/056,707", dated Jun. 28, 2018, 20 Pages.

"Non Final Office Action Issued in U.S. Appl. No. 15/056,707", dated Sep. 19, 2019, 19 Pages.

"Final Office Action Issued in U.S. Appl. No. 15/056,707", dated Jan. 8, 2020, 23 Pages.

* cited by examiner

| customers #102 |
|---|
| 15, John Doe, 1980 |
| 16, Jane Austen, 1960 |
| 17, Jules Vernes, 1975 |

FIG. 5

Database representation

600

| 1 | .... details omitted for brevity | customer #102 | 15, John Doe, 1980 | ② |
|---|---|---|---|---|
|   |   | 16, Jane Austen, 1960 |   |   |
| 3 | .... | customer #102 | 17, Jules Vernes, 1975 | 4 |
|   |   |   |   |   |

(write-ahead log file details omitted for brevity)

relay file #102                602                relay file #103

| event_size | event_type | data | data checksum |
|---|---|---|---|
| 100 | DDL | Create Table customers (customer_id int...) | 1X7A |
| 150 | Insert | 15, John Doe, 1980 | A798 |
| ... | Insert | 16, Jane Austen, 1960 | ... |
| ... | Insert | 17, Jules Vernes, 1975 | ... |
| ... | DDL | Alter Table Drop Column date-of-birth | ... |

DISTRIBUTED DATABASE WITH MODULAR BLOCKS AND ASSOCIATED LOG FILES

CROSS-REFERENCE TO RELATED APPLICATIONS

This application is related to the following concurrently filed and commonly owned patent applications:
Time Stamp Bounded Addition of Data to an Append-Only Distributed Database Table, Ser. No. 13/345,621, filed Jan. 6, 2012;
Logical Representation of Distributed Database Table Updates in an Append-Only Log File, Ser. No. 13/345,625, filed Jan. 6, 2012; and
Distributed Database with Mappings Between Append-Only Files and Repartitioned Files, Ser. No. 13/345,626, filed Jan. 6, 2012.

FIELD OF THE INVENTION

This invention relates generally to software based data storage and retrieval. More particularly, this invention relates to a distributed database with modular blocks and associated log files.

BACKGROUND OF THE INVENTION

A distributed database is a database in which partitions of data are distributed across discrete computational resources. The distributed database may be implemented in multiple computers located in the same physical location, or may be dispersed over a network of interconnected computers. A distributed database can reside on network servers on the Internet, on corporate intranets or extranets, or on other networks.

While distributed databases have favorable modularity, reliability, availability and scalability properties, it still desirable to develop techniques to enhance these favorable properties.

SUMMARY OF THE INVENTION

A system includes a master node and worker nodes controlled by the master node. Each worker node stores 25 or more modular blocks of a distributed database, where each modular block has a size of 5 G bytes or less and has an associated log file.

BRIEF DESCRIPTION OF THE FIGURES

The invention is more fully appreciated in connection with the following detailed description taken in conjunction with the accompanying drawings, in which:

FIG. 5 illustrates update data processed in accordance with an embodiment of the invention.

FIG. 6 illustrates database entries and a corresponding relay file utilized in accordance with an embodiment of the invention.

Like reference numerals refer to corresponding parts throughout the several views of the drawings.

DETAILED DESCRIPTION OF THE INVENTION

The invention is tailored towards analytics and data warehousing workloads. For example, data analytics workloads usually have data that has a time dimension, and this data is loaded in bulk into the system at regular intervals. An embodiment of the invention leverages these properties to propose new partitioning methods.

Prior art systems typically run on a few servers that are connected to each other over a specialized fiber disk or network connection. This invention is designed to scale to hundreds of servers over standard network connections. At that scale, the amount of data transferred over the network to perform large table joins becomes prohibitive. An embodiment of the invention minimizes the network I/O required to perform large table joins.

Prior art systems typically run on a few reliable servers that use a specialized fiber disk or network connection. In such systems, new servers are added to the system and old servers are removed infrequently and in a managed manner. An embodiment of the invention is designed to scale to hundreds of commodity servers. These servers may be in the cloud. At that scale, server additions and removals occur regularly. With commodity hardware or servers in the cloud, server and network failures become more frequent. An embodiment of the invention handles server additions and removals without impacting the system's performance and recovers from server and network failures without requiring user oversight.

Figure 1:
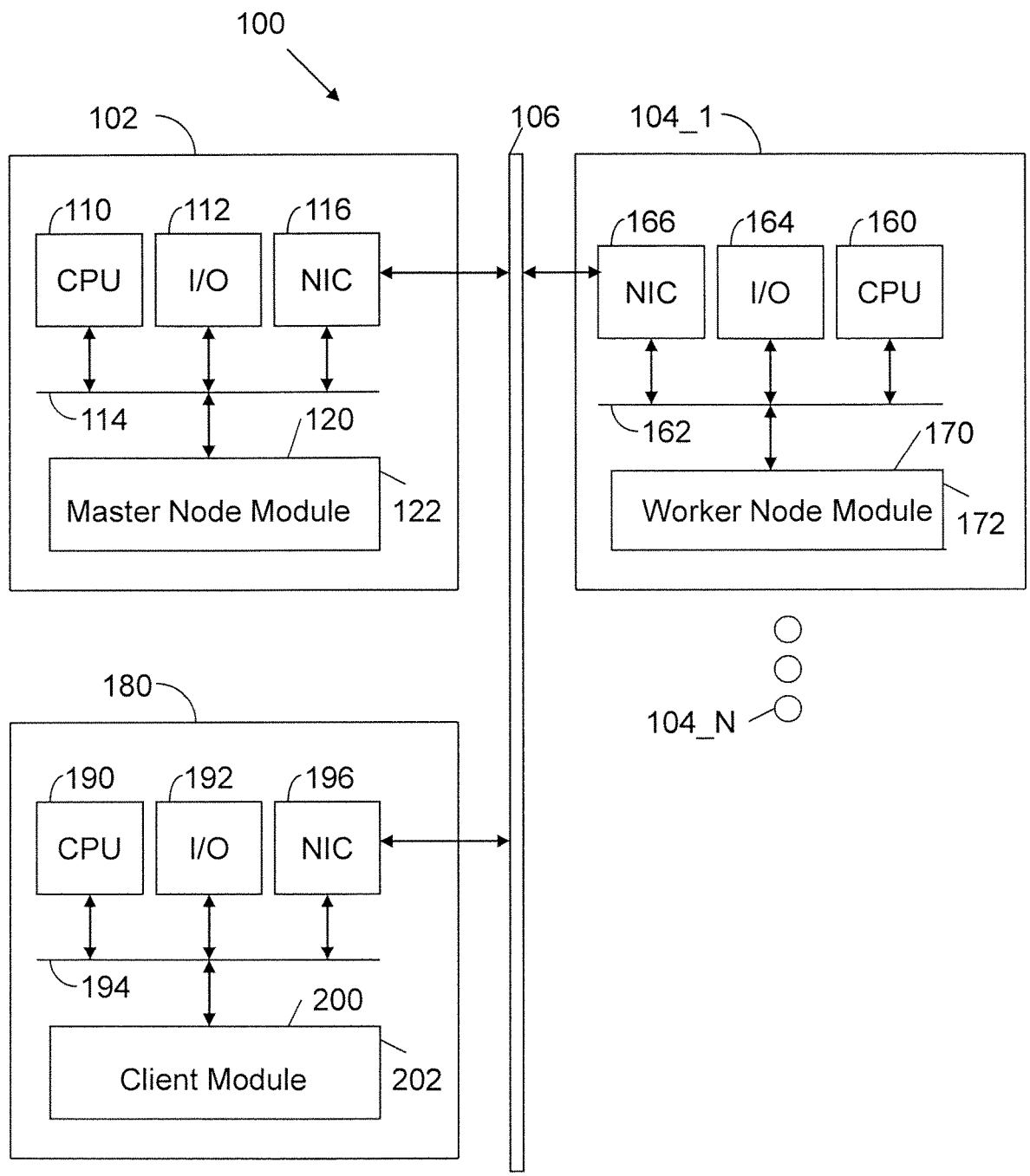
FIG. 1 illustrates a system configured in accordance with an embodiment of the invention.

FIG. 1 illustrates a system 100 configured in accordance with an embodiment of the invention. The system 100 includes a master node 102 and a set of worker nodes 104_1 through 104_N that implement a distributed database. The master node 102 is connected to the worker nodes 104 through any wired or wireless network connection 106.

The master node 102 includes standard components, such as a central processing unit 110 connected to a set of input/output devices 112 via a bus 114. The input/output devices 112 may include a keyboard, mouse, display, printer and the like. A network interface circuit (NIC) 116 is also connected to the bus 114 and provides access to the worker nodes 104 through network connection 106. A memory 120 is also connected to the bus 114. The memory 120 stores executable instructions to implement disclosed operations. In particular, the memory stores a master node module 122, which includes executable instructions to implement the distributed database operations disclosed below.

Each worker node 104 also includes standard components, such as a central processing unit 160, a bus 162, input/output devices 164 and a network interface circuit 166. Each worker node computer 104 also includes a memory 170 with executable instructions in the form of a worker node module 172. The worker node module 172 includes executable instructions that are responsive to commands from the master node module 122. Such commands relate to storage, access, replication and duplication of distributed database partitions, as discussed below. Additional commands relate to querying distributed database partitions to derive insights from the data.

The system 100 may also include one or more client computers 180. Each client computer 180 has an associated user of the distributed database. The client computer 180 also includes standard components, such as a central processing unit 190, a bus 194, input/output devices 192 and a network interface circuit 196. Each client computer 180 also includes a memory 200 with executable instructions in the form of a client module 202. The client module 202 may be a browser used to access the distributed database. Alternately, the client module 202 may be a dedicated application for interacting with the distributed database. This dedicated application may communicate with the distributed database through standard protocols such as Structured Query Language (SQL), Open Database Connectivity (ODBC) and Java-based Database Connectivity (JDBC). Finally, the client module 202 may be executed on worker nodes 104 to reduce the cost of data transfers during data upload operations.

Although system 100 includes many attributes associated with known distributed database configurations, the system 100 fundamentally departs from prior art distributed database configurations through its utilization of modular blocks and associated append-only log files. Each modular block holds a segment of data associated with the distributed database. The master node 102 defines the modular blocks and manages their distribution to various worker nodes 104. Each modular block has a size of 5 Gigabytes or less. This stands in contrast to prior art distributed databases, which partition the data into worker nodes and therefore do not impose a hard limit on the database partition size. As a result, prior art systems have distributed database partitions that range in size from around 100 Gigabytes to around 10,000 Gigabytes. Further, in the prior art, a single worker node holds a single partition of data from the distributed database. In contrast, with the present invention, each worker node 104 holds 25 or more modular blocks of partitioned data.

A partition is a division of a logical database into distinct independent parts. Each partition may be spread over multiple nodes. Users at a local node can perform local transactions on the partition. The disclosed modular block is a partition, but the term modular block is used to emphasize the size distinction compared to prior art implementations of distributed databases. This configuration has advantages in the event of a resource failure and when resources are added to the system.

For example, consider the case of a prior art system that partitions a database table across three nodes. Initially, data are loaded into the three nodes, and are partitioned evenly into three database table partitions. These database partitions then grow as more data are added to the system. Each partition typically grows to sizes that exceed 100 Gigabytes. At some point, a database administrator needs to add a new node into the prior art system to improve the distributed database's performance. When this node is added, the distributed database needs to shuffle large amounts of data over the network to evenly distribute the underlying data. In this example, a fourth of each database table partition is transferred over the network to the newly added node, and is then merged on the new node to create a new database table partition.

These data transfer operations in prior art systems have two drawbacks. First, database users continuously issue read and write queries against the system, and large data transfers adversely impact the system's and the queries' performance. If adding new nodes is infrequent enough, the database administrator can notify database users and take the system offline to wait for the data transfer operations to complete. However, if node additions are frequent, this becomes unmanageable.

Further, large data transfers also create challenges in terms of failure handling in prior art systems. In this example, for the new partition to be created, all three data transfer operations from the existing nodes have to complete successfully. If any one of the data transfers fails, all data transfer operations need to be rolled back to keep the entire data set consistent. When there are a few nodes in the system, and their hardware and network connections are reliable, several large data transfer operations on the order of 100 Gigabytes to 10,000 Gigabytes complete successfully. However, when the system runs on commodity hardware and scales to hundreds of nodes, the probability of all data transfers completing successfully becomes notably low.

Contrast this prior art system to an embodiment of the invention that stores the database table on three worker nodes 104, where each one of the nodes stores 40 modular blocks. When the database administrator adds a new node into the system, the distributed database can easily transfer ten modular blocks from each existing node into the new node. The distributed database can also spread the data transfer operations over time to minimize the performance impact. Since each modular block does not exceed a few Gigabytes, the system 100 can transfer a modular block and also process read and write queries with minimum performance impact. Further, data transfer operations for modular blocks are independent of each other, and if one of these data transfers fails, the failed data transfer operation can be retried in its entirety at another time. This is in contrast to prior art systems that require all data transfers to complete for the new database table partition to appear.

Besides their benefits in node additions, modular blocks also have advantages when nodes fail or need to be removed from the system. For example, consider a prior art system that has three original nodes; these original nodes hold three database table partitions. To handle node failures and removals, the system also has three replica nodes that are configured as exact replicas of original nodes. In the event of an original node failing, the database table partition on the original node becomes unavailable, and needs to be re-replicated from the replica node. For this, the distributed database issues a data transfer operation and creates a new replica database table partition on a standby node.

This approach however has the drawbacks described earlier that relate to large data transfers in prior art systems. The failed node's replica needs to transfer large amounts of data, while also answering live user queries. This large data transfer impacts the replica node's and therefore the queries' performance. Further, since the data transfer operation is for large data sets and continues on for a while, the transfer itself may fail midway through due to a hardware or network issue. In fact, the drawbacks mentioned earlier are exacerbated as the data transfer resulting from the original node's failure falls unevenly onto its replica node.

In addition, the original node's failure also introduces a third drawback. All live queries running on the original node now need to be restarted on the replica node. In data analytics workloads, it is not uncommon for business intelligence queries to execute for hours or even days. This node failure then on average increases these queries' execution times by 50%, as all progress on running queries are lost and the queries need to be restarted in their entirety on the failed node's replica.

Comparatively, an embodiment of the invention overcomes these issues by storing data in modular blocks. For example, assume the system 100 has six worker nodes 104, where each worker node 104 stores 40 modular blocks. Each modular block in the system is replicated to two worker nodes that are selected at random. Therefore, when one of the nodes fails, on average eight modular blocks from each one of the remaining nodes need to be replicated. That is, the task of re-replicating data gets spread evenly across all nodes in the system. Further, the re-replication task can also be spread across time. One modular database block can be replicated first, followed by another modular block. Since each modular block is small in size, the performance impact on the node is minimal. Further, if a hardware or network failure occurs during the shorter data transfer operation, the operation can simply be retried at minimal cost.

Additionally, when one of the nodes fails, all analytics queries still need to be restarted, but this work gets evenly distributed across all five nodes in the system 100. Therefore, failed analytics queries in the system take only 10% longer, as opposed to 50% longer in prior art systems. This particular benefit becomes more pronounced in distributed systems that have hundreds of nodes. At those scales, the probability of any one node failing is much higher, and when such a failure occurs, the failed analytics queries can be distributed across many more nodes.

In summary, modular blocks have notable advantages for data analytics workloads, and these benefits become more visible when the nodes use commodity hardware, and as the number of nodes in the system increases. The worker nodes 104 in the described system are defined as peers, but it is worth noting that they may also be configured as part of a hierarchy. Further, the worker nodes 104 may need to reach a distributed consensus in the system 100. One method of reaching distributed consensus is through using protocols such as two-phase commit, Paxos, or quorum-based voting. Another method of achieving consensus is through relying on a master node module 122 that coordinates other nodes and the execution of queries in the system. The master node module 122 receives a database query from a client device 180 and partitions the database query to run in parallel across the plurality of slave or worker nodes 104. The master node module 122 may collect statistics about data in the modular blocks and then use those statistics to optimize a database query. For example, the master node uses these statistics to determine the modular blocks that are not relevant to a particular data analytics query, and prunes away these irrelevant blocks from the query. The master node module 122 also keeps statistics on modular block locations, modular block sizes, log files, and last update times. These statistics are used to direct queries to modular blocks and to maintain block data consistency in the face of failures. These statistics are then updated either through the master node 102 initiating a connection to the worker nodes 104, the worker nodes 104 initiating a connection to the master node 102, or the client module 202 sending them to the master node 102 after uploading data to the worker nodes 104.

The master node module 122 also maintains availability information for the different worker nodes 104. The master node module 122 then uses this availability information to determine the placement, re-placement, or replication of modular blocks across the worker nodes 104. In contrast to the prior art, the master node module 122 has more flexibility in terms of how it places new blocks or replicates existing blocks. For example, the master node module 122 may use the availability information on worker nodes to determine their failure characteristics and to place fewer modular blocks on the nodes that are deemed more likely to fail. Or, the master node may combine this availability information along with network locations of worker nodes, and may ensure that enough replicas for a modular block remain accessible even in the face of a data center outage.

The master node module 122 also maintains distribution information for the modular blocks across the worker nodes 104. The master node module 122 then uses this distribution information to determine the placement, re-placement, or replication of modular blocks across the worker nodes 104. The system 100 compares favorably to the prior art in terms of data distribution. The master node module 122 may combine the distribution information on modular blocks with the resource information for worker nodes 104, and may distribute the modular blocks in proportion to the resources available on worker nodes 104. As such, the system 100 may contain worker nodes 104 that are heterogeneous in their resources, and the worker nodes with more resources simply get assigned more modular blocks.

The master node module 122 may include various configurable parameters to control distribution, re-distribution and replication operations. In one embodiment, the modular block size is configurable through the master node module 122. For example, the modular block size may be configurable to any value less than 5 Gigabytes. Alternately, the modular block size is configurable to a value less than 8 Gigabytes. A range between 4 and 6 Gigabytes may also be specified. Additional methods of specifying the modular block size are also possible. Modular block sizes are proportional to the input file size and the log file size. In other embodiments, the input file size or the log file size may be preferred over the modular block size, and may be configurable through the master node module 122.

The master node module 122 and/or the client module 202 need to ensure that modular blocks conform to their specified sizes. As a result, if a modular block has its entries deleted and diminishes below its specified minimum size, the modular block needs to be merged with another block.

Similarly, if a modular block grows beyond its specified maximum size, then either a new modular block is created or an existing modular block is split into two blocks. The particular mechanism through which these blocks are created depends on the partitioning method. If the database table is partitioned using hash or range partitioning, the master node module 122 orders the split of an existing block into two by assigning half of the rows to each new block. The master node module 122 then records the hash bucket values or the range ordering for the two new blocks. If, however, the partitioning method does not need to impose a strict ordering between database table rows, then the client module 202 simply takes an input file, creates a block on the worker node, and starts uploading data into that block. If the block size exceeds the maximum configured size, the client module 202 creates another new block, and continues uploading data into this new block. When all input data are loaded into modular blocks, the client module 202 commits all block placement information and other important statistics with the master node module 122.

The disclosed architecture supports a feature referred to herein as append partitioning. This partitioning method becomes applicable when data are loaded into the database in batches, rather than as short requests. Further, the partitioning method assumes that the underlying data has inherent minimum and maximum parameters, and that the underlying data can be modeled and loaded into the database in an append-only manner. For data with these properties, append partitioning offers an efficient data loading and querying mechanism.

For example, consider an online website that records all pages viewed by its customers. The website loads these data by aggregating them regularly into hourly text files. Further, these hourly text files have inherent minimum and maximum timestamps; and the page view data they contain are immutable and therefore can easily be loaded into the database in an append-only manner.

In this example, the data loading operation may start with a client module 202 asking the master node module 122 to allocate a new database table partition and to return the name of the worker node 104 to upload data into. The client module 202 then creates the new database table partition on the worker node 104, uploads hourly text file data into it, and retrieves the minimum and maximum time stamps from these data. The client module 202 finalizes the data upload by sending minimum and maximum time stamps and other statistics to the master node module 122. The master node module 122 stores this information to optimize future analytics queries.

Later, when the user sends a query like "the most popular page viewed last Tuesday", the database can automatically prune away database partitions whose start and end time stamps do not fall into those of last Tuesday's. In fact, the database can optimize a significant number of queries this way.

Prior art methods also introduce similar query optimizations that relate to partition pruning, but they impose more strict requirements around how data are loaded into the system. For example, one prior art method requires that database administrators manually specify the time range for each hourly text file they upload. This approach enables query optimizations, but the manual process also introduces notable administrative challenges. Comparatively, append based partitioning operates under the assumption that hourly text files already come pre-aggregated and have an inherent time dimension, and automatically extracts the time range from each hourly text file.

Another prior art method database administrators typically use involves hash or range partitioning of a database table. This method allows for partition pruning, but it also introduces inefficiencies during data loading. With this method, each webpage view data in the hourly text file is hash or range partitioned, and is then routed to the relevant partition. As a result, the module uploading the data either needs to communicate with the master node module 122 for every row in the hourly text file, or needs to obtain a lease or a lock on the database table to enforce the hash or range ordering between different database table partitions.

Comparatively, append based partitioning recognizes that hourly text file data does not get updated, and therefore enforcing a strict relationship between each row and the database table partition for that row is unnecessary. Instead, the database administrator can efficiently and independently load hourly text data from any node in the system. In fact, these data loads can even occur in parallel. The master node module 122 only needs to be involved to manage the creation of new database table partitions, and to store metadata that relates to the uploaded data. As a result, page view data can be efficiently and concurrently loaded into the database.

Figures 2, 3:
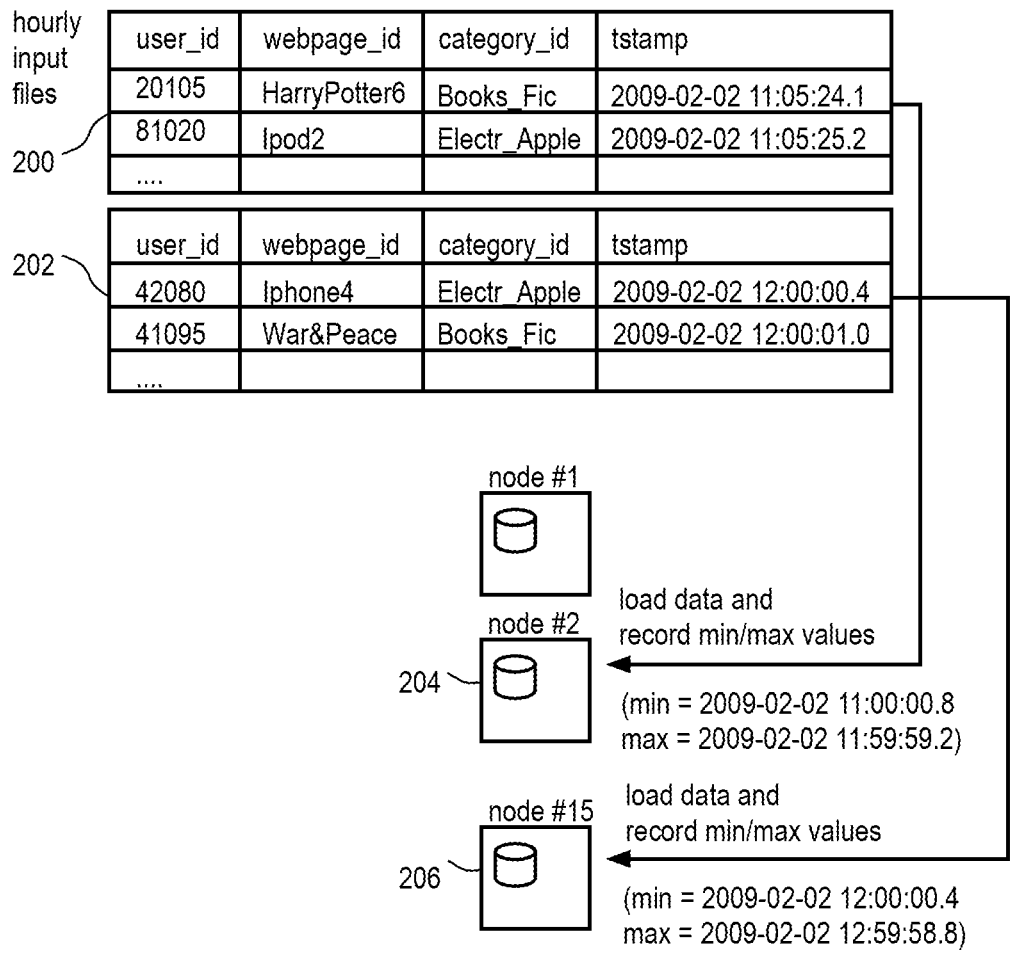
FIG. 2 illustrates minimum and maximum loading operations performed in accordance with an embodiment of the invention.
FIG. 3 illustrates minimum and maximum loading statistics maintained in accordance with an embodiment of the invention.

FIG. 2 illustrates a first hourly input file 200 and a second hourly input file 202. Each input file has a user_id column, a webpage_id column, a category_id column and a time stamp column. The time stamp column specifies a date and time for the activity characterized in a row. The hourly input file 200 tracks actions performed during the $11^{th}$ hour on the date 2009-02-02, while the hourly input file 202 tracks actions performed during the $12^{th}$ hour on the date 2009-02-02. The data from hourly input file 200 is loaded onto node 204 and the data from hourly input file 202 is loaded onto node 206. In some embodiments, the master node module 122 may coordinate the uploading of data across different worker nodes 104. Further, the master node module 122 may use worker node availability or data distribution information to determine the set of worker nodes to upload the data into.

Observe that the user can load multiple files concurrently without the system maintaining locks and leases. The user also does not need to choose or specify hour or day granularity of the data to be uploaded. Further, the user does not need to manually create partitions before inserting data.

FIG. 3 illustrates a statistics table 300 that may be maintained by the master node module 122. In this example, the statistics table 300 includes a table_id column, a partition_id column, a min_value column and a max_value column. Row 302 represents one database table partition that corresponds to the first hour on the date 2009-02-01. That is, the row specifies the table_id and partition_id for data collected during the first hour on this date. Row 304 specifies the eleventh hour on the same date. Rows 306 and 308 specify the twelfth hour on the same date. Two entries for the same hour may occur because one or more webservers had trouble transferring their page view data and these page views were aggregated and loaded into the system at a later time.

The statistics table 300 is used to optimize queries that have time ranges. For example, the master node module 122 may receive a query that asks for the most popular webpage between the eleventh and twelfth hour on 2009-02-01, inclusive. In this case, the master node module uses the stored start and end timestamps in the statistics table 300, and prunes all database table partitions except for those identified by rows 304, 306, and 308. The master node module 122 then sends the most popular webpage query only to database table partitions 314, 316, and 318, receives responses from these database table partitions, merges the responses, and returns the merged response back to the user.

For the master node module 122 to perform partition pruning, it does not need to know that a day corresponds to a 24-hour time interval; databases already have built-in comparison operators for time data types. The master node module simply compares the time range in the analytics query against the minimum and maximum time stamps in the statistics table and determines the relevant partitions.

In summary, append based partitioning offers the same partition pruning benefits as hash and range partitioning. In append partitioning however, the master node module 122 does not need to be involved with data upload operations on a per row level. Instead, worker node modules 172 or client node modules 202 track certain metadata when they are uploading data. When they commit this metadata, the uploaded database table partitions become visible to all nodes in the system.

Further, these database table partitions may also be modeled as modular blocks, where each modular block has a fixed maximum size. For example, a command to load webpage view data for a certain hour is received. The command first asks the master node module 122 to respond with a unique identifier for the modular block to be created, the names of the nodes to which the data should be loaded, and the desired replication factor. The master node replies with the answers, and the command uploads and replicates page view data to the specified nodes.

If the uploaded data exceeds the maximum size defined for modular blocks in the system, a new modular block is created and a request is issued to the master node for additional information. When all data are uploaded into modular blocks, the command finalizes block locations and minimum and maximum statistics with the master node module 122.

The disclosed technique may be utilized in connection with an append-only database table that contains facts or events data that characterize core business functions. The append-only database table may also be a slowly changing dimension table, and may store timestamps along with every change. This dimension table may also be loaded from scratch into the database when enough data changes occur.

Observe that this append partitioning feature may be accompanied by various database management operations, such as replicating modular blocks across different nodes and automatically creating new database table partitions. These operations may be implemented with the master node module 122.

Also observe that this append partitioning feature is applicable in both a shared nothing and in a shared disk architecture. In a shared-nothing architecture, the database is partitioned across nodes in the system where each node has its own resources. In a shared-disk architecture, the storage area for the database is partitioned across individual disks that are either configured as a storage array network (SAN) or a network attached storage (NAS).

This disclosure has described modular blocks utilized in accordance with an embodiment of the invention. Each modular block has an associated log file. A log file records all changes associated with a modular block. The log file is an append-only log file. An append-only log file records additional data changes, without deleting prior logged operations. That is, even data update and delete operations are recorded as separate entries in the log file. Log files are also referred to herein as relay files.

In accordance with an embodiment of the invention, the append-only log file represents changes to the data in a manner that is independent of the data's physical representation on any given node of the system. For example, data is specified in a logical manner (e.g., a table name and a data tuple representing the row) instead of in a physical manner (e.g., a storage address). This approach has a number of advantages over prior art techniques.

Prior art databases keep database tables and the data within them in a contiguous format. In other words, a database table's metadata and redo logs are typically coupled with those of other databases. Additionally, the database table's data is represented in a physical manner for performance reasons. That is, this data is scattered around different database files and are tied together through database page numbers, page pointers, or offset numbers. For example, data for a particular row in the database table is stored on a particular database file, page, and offset number. The next row in the database table may then be stored on a completely different database file, page, and offset number.

This physical representation and strong coupling of data introduces challenges. First, it becomes notably hard to take only a part of the database table and move it across the network. Second, even when moved, the part of the database table also needs to be reconstructed on another node that has its own physical representation of its database. Because of these challenges, distributed databases typically configure several nodes as exact replicas of one another and replicas keep the exact same physical representation of a database. This, however, makes it very hard to move only parts of database tables around.

Another shortcoming with this approach is that it is hard to keep the table data consistent, particularly in the event of failures. For example, if the user updates or deletes a row in one table, then this change needs to be replicated to other nodes that have replicas of this table. If these nodes are unavailable, then changes to this table need to be remembered and applied at a later time. With nodes regularly failing and many tables stored on a single node, keeping the data consistent becomes challenging.

An embodiment of the invention overcomes these difficulties by receiving a database table update to a distributed database. The database table update is loaded into a database table partition on a node of a computer network executing the distributed database. The database table partition or modular block does not exceed a maximum size (e.g., 5 Gigabytes). The database table update is added to an append-only log file corresponding to the database table partition. In particular, the database table update represents a data insertion, a data load, a data modification, a data deletion, or a Data Description Language (DDL) event. Further, the data associated with the database table update is stored in the append-only log file in a logical representation that is independent of the physical representation of the data at the node. This facilitates transferring the database table partition to other nodes within the computer network.

Figure 4:
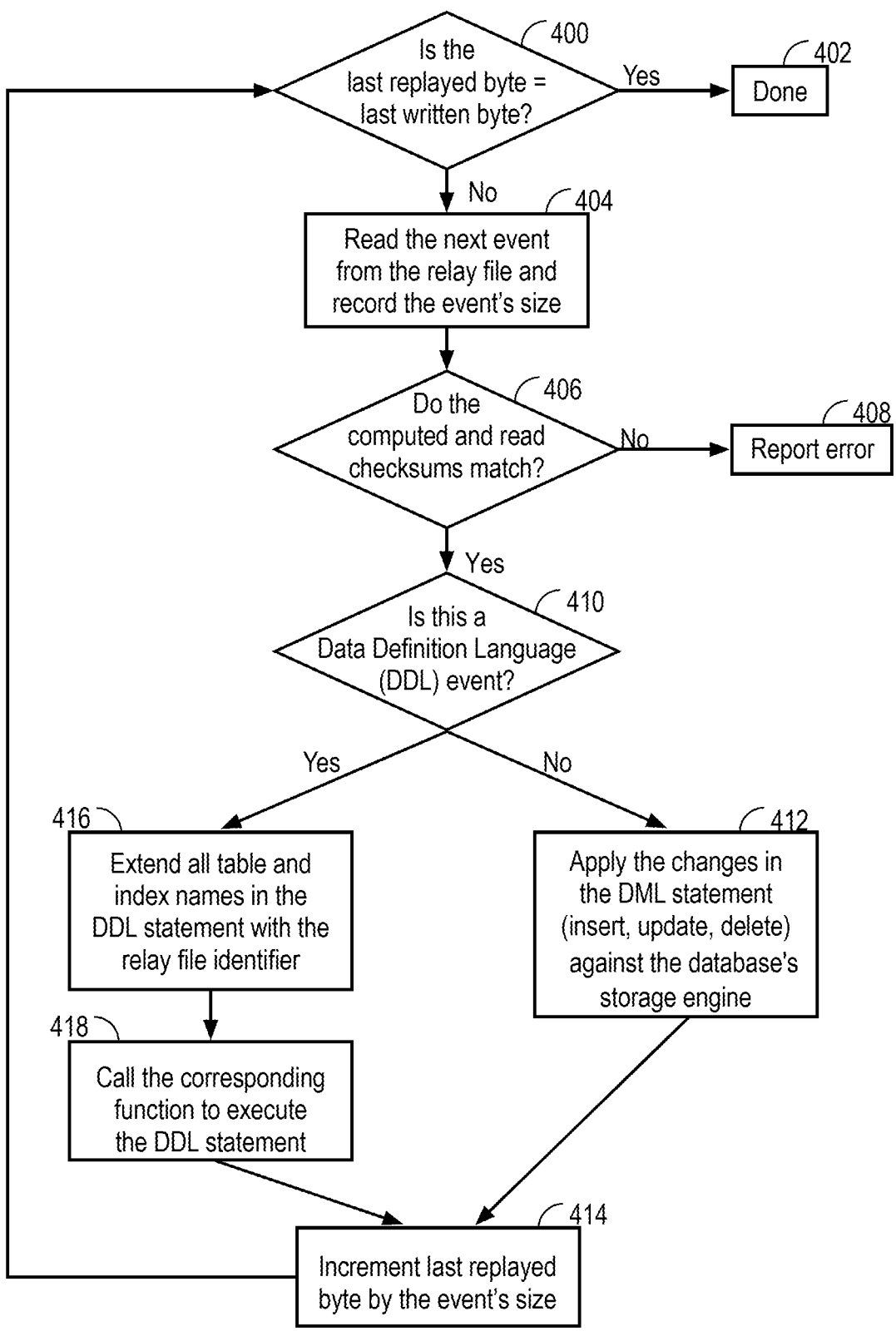
FIG. 4 illustrates relay file processing operations associated with an embodiment of the invention.

FIG. 4 illustrates processing operations associated with this embodiment of the invention. Initially, it is determined whether the last relayed byte is the same as the last written byte 400. If so, the relayed information does not include any updates and processing is completed 402. If the bytes do not match, then the next event is read from the relay file 404. The event size is also recorded in this operation. A checksum match is then performed 406. If the checksums do not match, an error is reported 408. If the checksums do match, first the event type is resolved. Then it is determined whether the event is a Data Definition Language (DDL) event 410. If not, the specified change is applied against the database's storage engine 412. For example, an insert, update or delete is applied. The last replayed byte is then incremented by the event's size 414.

If this is a DDL event, then the table and table index names are extended in the DDL statement with the relay file identifier 416. The table and table index names may need to be extended to allow for keeping multiple partitions of the same table on the same node. The corresponding function is then called to execute the DDL statement 418. The last replayed byte is then incremented by the event's size 414.

These operations are more fully appreciated with reference to an example. FIG. 5 illustrates received database table updates processed in accordance with an embodiment of the invention. The figure indicates changes for table 102 for three rows that have customer_id 15, 16 and 17. For customer_id 15 the name John Doe is to be added along with the birth year of 1980. The same format applies to rows containing customer_ids 16 and 17.

FIG. 6 illustrates a database representation 600 of these changes. The figure illustrates the specified information in FIG. 5 loaded into database 600. These changes may be added to the database by using a set of operations, and the changes are stored at different database pages and offsets. The changes are then loaded into relay file 602. Relay file 602 specifies an event size, an event type, data and a checksum.

Thus, at this point, a database table update has been received, as shown in FIG. 5. The database table update is loaded into a database table partition on a node of the computer network, as shown with database representation 600. The database table update is also added to the append-only log file, as shown with relay file 602. The worker node module 172 may implement these operations and may notify the master node module 122 of progress.

Figures 7, 10:
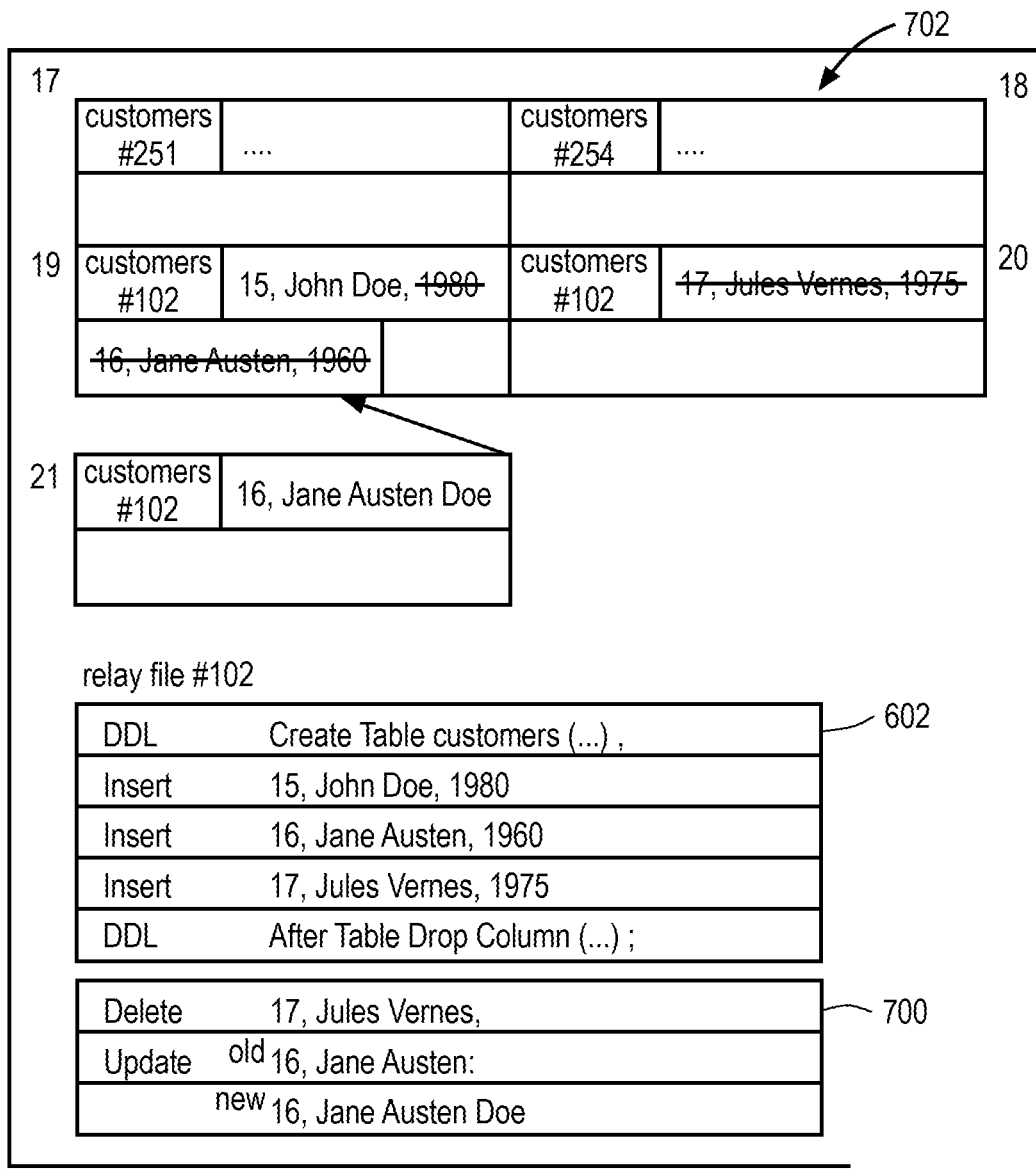
FIG. 7 illustrates relay file updates processed in accordance with an embodiment of the invention.
FIG. 10 illustrates data updates applied to the configuration of FIG. 9.

Suppose now that it is determined for privacy reasons that the birth years should not be maintained. To implement this operation, a DDL statement "Alter Table Drop Column Date of Birth" is executed and added to the relay file 102. Additional operations 700 are added to the relay file 602 to implement these operations, as shown in FIG. 7. Database representation 702 reflects these changes.

The relay file or recently appended parts of the relay file is easily transferred to any node 104 in the system. Data changes from the relay file are applied on another node to create a replica database table partition and insert data into this replica partition. The specifics of how data are initially appended to relay files and replicated across nodes may differ depending on the nature of database table updates.

In one embodiment, the database table updates represent a broad range of commands. As examples, consider the following three commands: (a) Update products Set price=price*1.10 Where product_id=9700; (b) Insert Into products (product_id, product_price) Values (9700, random( ); and (c) Insert Into products (product_id, product_price) Values (9700, 15.00). The first command is a data modification command with side effects, the second one is a non-deterministic data insertion command including random( ) and the third one is a deterministic data insertion command.

For the first two commands, a single node needs to execute them first, get their results, log these results into the corresponding relay file and replicate this relay file to another node for replaying. Otherwise, two separate nodes can generate two different results for random( ) and be inconsistent with one another. Similarly, two separate nodes executing a function such as now( ) or incrementing an auto-increment column value such as serial can generate different values. More generally, a data modification command, a data deletion command, and a non-deterministic data insertion command need to be executed on a single node first. The results of this execution are then logged to a relay file and are replicated via the relay file.

In another embodiment, the database table updates represent a more narrow set of commands. Namely, these commands include a deterministic data insert and a data load command. These commands do not pose the risk of generating two different values on two different nodes, and therefore can be replicated across different nodes prior to execution. Once an insert or load command is replicated to different nodes, the nodes can independently apply the command and append it to their relay files.

When a relay file (append-only log file) needs to be transferred across the network, the append-only log file may be compressed to reduce network traffic. The append-only log file may also be compacted to reclaim space allocated by data modification and data deletion commands. This compaction may occur in the form of creating a new append-only log file. Further, since an append-only log files stores logical changes to the data, the file can be used in conjunction with databases from different vendors, given that a connector between the append-only log file and the database is available.

As shown in connection with FIGS. 4 and 6, the append-only log file may maintain a last written byte offset and a last applied byte offset. In addition, adding a database table update to an append-only log file may include calculating and adding a checksum for the database table update. The size of the database table partition or the append-only log file may be configurable. In one embodiment, the database table partition has a unique identifier that is recognized across the system 100. This unique identifier may be hardcoded into the log entries in the append-only log file or may be abstracted away into the name of the log file.

Figures 8, 9:
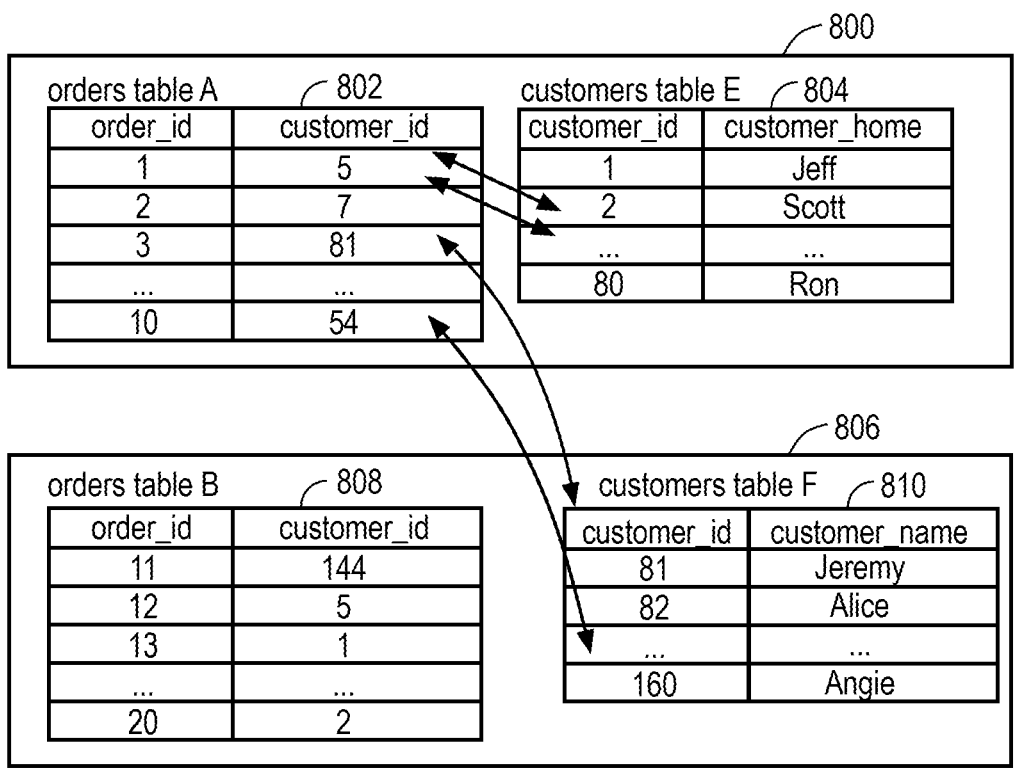
FIG. 8 illustrates table join operations associated with an embodiment of the invention.
FIG. 9 illustrates repartitioned tables with updated values received in accordance with an embodiment of the invention.

The relay file technique of the invention can be further exploited in connection with table joins. FIG. 8 illustrates a first node 800 with an orders table partition 802 and a customers table partition 804. Another node 806 has an orders table partition 808 and a customers table partition 810. The orders table and the customers table are large tables distributed across different nodes, as shown. A table may be considered as large when the table is too costly to replicate in its entirety to all nodes in the system.

The orders table is partitioned on the order_id and the customers table is partitioned on the customer_id. If these two tables need to be joined together to support a query, the order table needs to be repartitioned on the customer_id across all nodes in the system. Existing database solutions (perhaps after applying filtering projection or other operations) reparation an entire table and transfer the repartitioned table across the network. This occurs on almost every join because it is difficult to track changes to the base data. In practical applications of a distributed database, the repartitioned table is enormous and cannot be stored on a single node. Thus, significant data processing and data transferring is needed on every join to support the repartitioning operation.

FIG. 9 illustrates an embodiment of the invention in which nodes 800 and 806 together hold the orders table. The distributed database receives an analytics query that requires joining the orders and the customers tables. The distributed database chooses the orders table for repartitioning and commands the table partitions 802 and 908 to be repartitioned on customer_id. The distributed database also specifies the repartitioning method as range partitioning and determines that the data should be repartitioned into two ranges. Consequently, node 800 reparations table 802 on the customer_id dimension and keeps part of the repartitioned data locally, while transferring the other part to node 806. Node 806 performs a similar operation. In total, these operations result in four data repartitions. Node 800 takes two of the data repartitions and merges them into the repartitioned table 904. Similarly, node 806 merges the two data repartitions into the table 912. Finally, the distributed database joins the repartitioned table 904 with the customers table 804, and the repartitioned table 912 with the customers table 810, and answers the analytics query.

The particulars of the table repartitioning method or the data transfer mechanisms may differ depending on the context. For example, a table may be repartitioned using hash or range partitioning. Similarly, repartitioned data may be transferred between nodes in a streaming manner or may be written to intermediate files before the transfer.

After the initial table repartition operation described above, more changes may be applied against the base table partitions. When a second table repartition is then issued, the disclosed method only needs to repartition and shuffle the recent changes.

FIG. 9 illustrates example changes 914 that are applied against the repartitioned table 904, and changes 916 that are applied against the repartitioned table 912. FIG. 10 illustrates data representations 1000 that correspond to the changes 914 and 916.

In summary, the disclosed method only repartitions and merges recent changes to the base data, and compares favorably to prior art methods that need to repartition the entire data set. In the disclosed method, one can just repartition a relay file and append the repartitioned data to existing repartitioned relay files. Consequently, the penalty of repartitioning and shuffling data is paid only once. After the initial repartitioning, only new inserts, updates and deletes need to be repartitioned.

Since the data is maintained in append-only relay files, one can easily determine any new changes since the last query execution time. One can repartition these changes, append them to the relay files and replay them against the database. The use of relay files is plausible in this context because fact tables in a data warehouse are append-only and dimension tables are relatively small and change infrequently.

Figure 11:
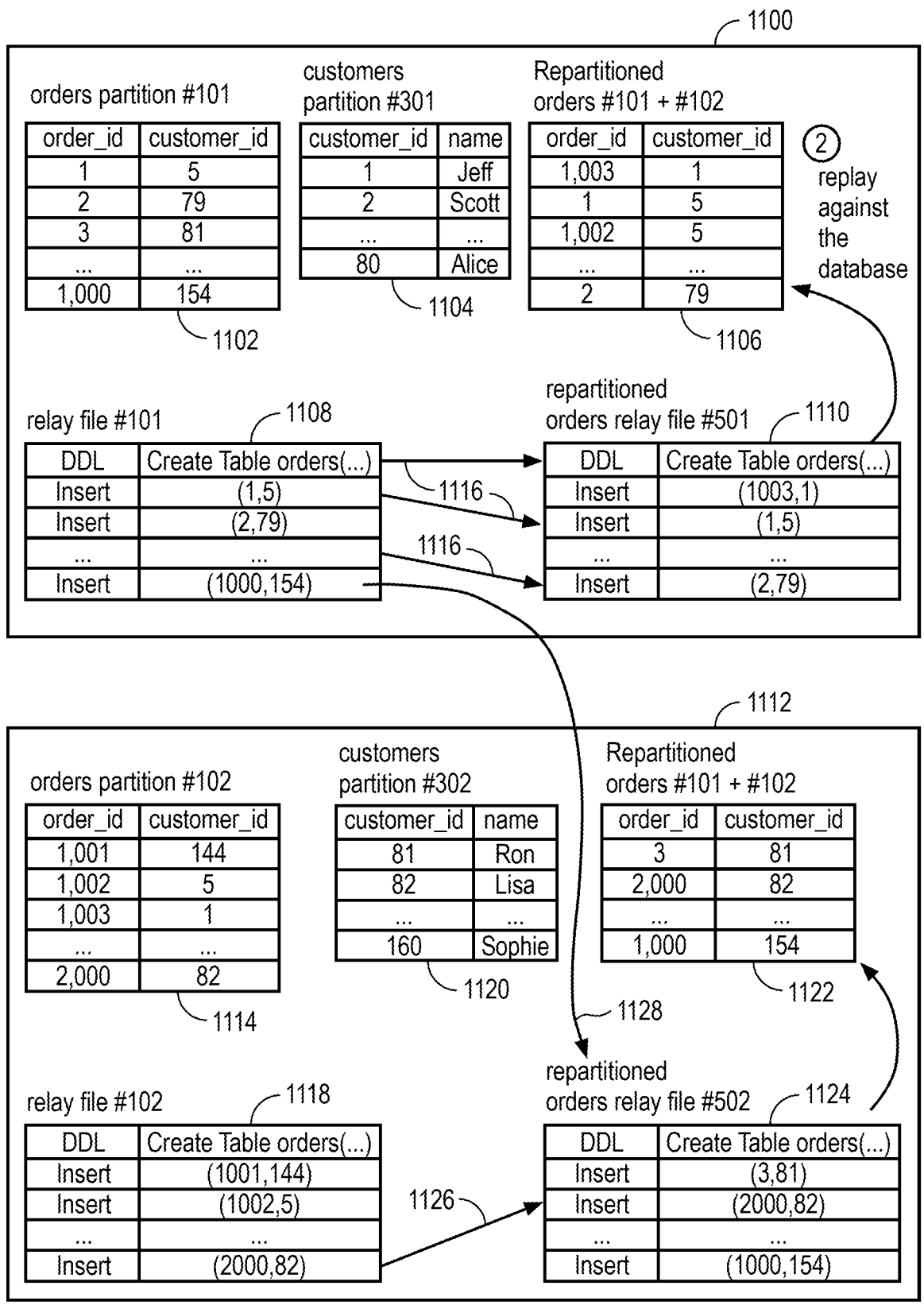
FIG. 11 is a more detailed example of repartitioning operations performed in accordance with an embodiment of the invention.

These operations are more fully appreciated with reference to FIG. 11. FIG. 11 illustrates a first node 1100 with an orders table partition 1102 and a customers table partition 1104. The orders partition 1102 has a corresponding relay file 1108, which may be used to construct the orders partition on another node. Node 1100 also has a repartitioned orders table 1106, which is a repartition of table 1102 on node 1100 and table partition 1114 on node 1112. Table 1106 has a corresponding relay file 1110. Repartitioned relay file 1110 receives entries from relay file 1108, as shown with arrows 1116.

Orders table partition 1114 has a corresponding relay file 1118. Node 1112 also has a customers partition 1120 and a repartitioned orders table 1122, which has a corresponding relay file 1124. The relay file 1124 has an entry from relay file 1118, as shown with arrow 1126 and an entry from relay file 1108, as shown with arrow 1128.

Figure 12:
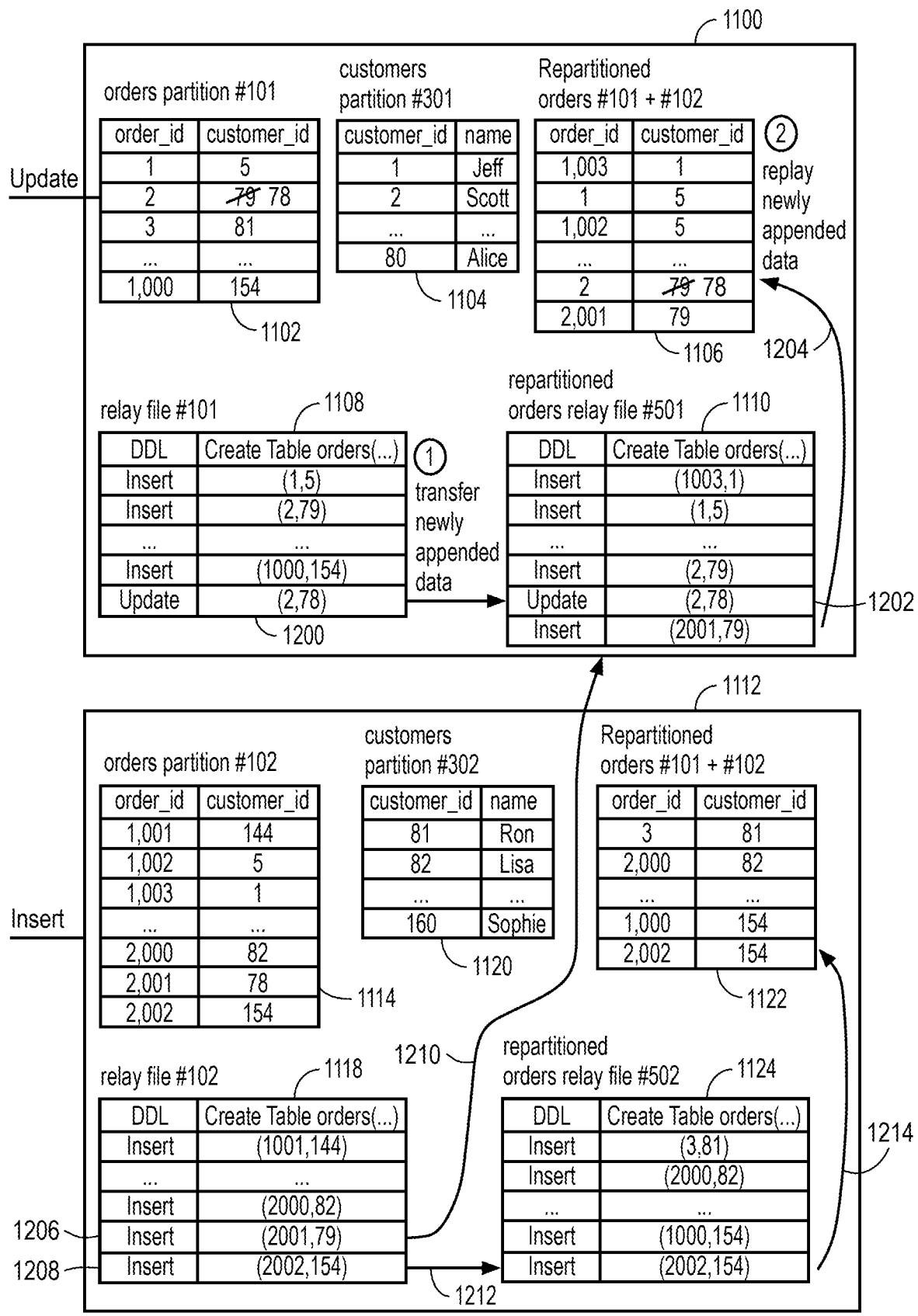
FIG. 12 illustrates data updates applied to the configuration of FIG. 11.

FIG. 12 illustrates the components of FIG. 11 after they have received updates. Relay file 1108 receives update 1200, which is passed to repartitioned relay file 1110, as shown at row 1202. This change is then replayed to repartitioned table 1106, as shown with arrow 1204. Similarly, relay file 1118 receives update 1206, which is passed to repartitioned relay file 1110, as shown with arrow 1210. In addition, relay file 1118 receives update 1208, which is passed to repartitioned relay file 1124, as shown with arrow 1212. In turn, this change is applied against table 1122, as shown with arrow 1214.

Thus, data changes are received at relay files (append-only files). Mappings between the append-only files and repartitioned files are then used to make changes in the repartitioned files. The append-only files may include data insert, load, update, delete and Data Description Language (DDL) operations. The append-only files may be text files, binary files or log files.

The append-only files are better represented as text files when the underlying data contains only deterministic insert and load operations. In that case, the text file can easily represent a database table's contents. In fact, the text file may not even need an additional database file to represent the database table's contents. For example, a comma separated text file may represent a database table, where newlines separate rows and commas separate columns. Further, this text file is easy to transfer between nodes; the text file already keeps the data in a logical representation, and the system does not need to worry about data's different physical representations across the nodes. A received database query may be partitioned to run in parallel across the repartitioned files. The master node module 122 may maintain statistics on data in repartitioned files. The statistics may then be used during query planning to prune repartitioned files not relevant to the query. The master node module 122 may also employ other query optimization techniques, such as applying filtering and projection operations before data transfers to reduce the amount of data transferred across the network. The master node module 122 may support a configuration value to determine the number of repartitioned files and a configuration value to determine the maximum size of repartitioned files. A configuration value may also be used to specify the maximum size of a database table partition. If the database table partition or the repartitioned files exceeds their configured maximum size, they may be automatically split into smaller partitions or repartition files. Statistics about these the smaller partitions or repartition files may then be reported to the master node module 122.

Further, the master node module 122 may represent a database table partition or a repartitioned file as a modular block. This representation has the advantage that a small database table is represented with a few modular blocks and that these blocks can easily be replicated to all nodes in the system to perform efficient table joins. Also, updates to modular blocks can easily be tracked and propagated to the replica blocks.

Comparatively, prior art methods partition the data into nodes and not into modular blocks. As a result, a small table may be partitioned into dozens of database table partitions, and all of these partitions may need to be replicated to all the nodes. For example, in a system with 50 nodes, a table join command may result in 2,500 replication operations even if the database table's size is small. Further, subsequent updates to the database table also become harder to keep track of and to propagate.

In other words, modular blocks introduce benefits when a table join involves a small table. For example, to answer a table join command that involves one small and two large tables, the small table may be replicated to all nodes in the system, and one large table may be repartitioned on the partition dimension of another large table. The distinction between a large and a small table may be defined in multiple ways. One method may leave the definition to the user by providing a configuration value to define the minimum number of shards a large table should have. Another method may measure the cost of replicating the table in its entirety to all nodes in the system and may weigh that cost against the cost of repartitioning the underlying data.

Repartitioning of the data may automatically be initiated by a table join or distinct count command. Once the base table is repartitioned, the repartitioned files may be used to perform the table join command. This table join command may more specifically represent an inner join, a left outer join, a right outer join, a full outer join, a semi join, or an anti join. Alternately, repartitioning of table data may also be initiated by a manual database command.

For example, if a user knows that a table is frequently accessed on another dimension, the user may manually create a repartitioned table by using Create Table As or Select Into commands.

In general, each database table partition will have a single append-only relay file. The database table partitions are distributed and replicated across the different nodes 104 of system 100.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:
a master node; and
a plurality of worker nodes controlled by the master node, wherein each worker node stores 25 or more modular blocks of distributed database partitions, wherein each modular block holds a segment of data associated with the distributed database partitions, and wherein each modular block of the distributed database partitions has a size of 5G bytes or less and has an associated log file to record changes associated with the distributed database partition;
wherein the master node and the plurality of worker nodes are commodity hardware servers that communicate over a distributed network utilizing standard network connections and protocols; and
wherein the master node collects statistics about data in the modular blocks and uses the statistics to optimize a database query.

2. The system of claim 1 wherein the master node receives the database query and partitions the database query to run in parallel across the plurality of worker nodes.

3. The system of claim 1 wherein the master node collects statistics selected from modular block location, size, associated log file and update time.

4. The system of claim 3 wherein the master node communicates with the plurality of worker nodes to update the statistics.

5. The system of claim 1 wherein the master node maintains availability information for the plurality of worker nodes.

6. The system of claim 1 wherein the master node maintains distribution information for the modular blocks across the plurality of worker nodes.

7. The system of claim 5 wherein the master node determines the placement of new modular blocks using the availability information for the plurality of worker nodes.

8. The system of claim 6 wherein the master node determines the placement of new modular blocks based upon the distribution information for the modular blocks.

9. The system of claim 1 wherein the master node redistributes modular blocks across the plurality of worker nodes.

10. The system of claim 5 wherein the master node redistributes modular blocks based upon the availability information.

11. The system of claim 6 wherein the master node redistributes modular blocks based upon the distribution information for the modular blocks.

12. The system of claim 1 wherein the master node controls the replication of modular blocks across the plurality of worker nodes.

13. The system of claim 12 wherein the master node controls the replication of modular blocks based upon availability information for the plurality of worker nodes.

14. The system of claim 12 wherein the master node controls the replication of the modular blocks based upon distribution information for the modular blocks.

15. The system of claim 12 wherein replication is a configurable parameter.

16. The system of claim 1 wherein the modular blocks have a size configurable to any value less than 5 GB.

17. The system of claim 1 wherein the master node produces a new modular block when a current modular block exceeds a maximum size.

18. The system of claim 1 wherein the master node produces a new modular block with half of the information from a current modular block when the current modular block exceeds a maximum size.

* * * * *